US012707084B2

(12) United States Patent
Guede et al.

(10) Patent No.: US 12,707,084 B2
(45) **Date of Patent: *Aug. 11, 2026**

(54) METHOD AND DEVICE FOR CODING THE GEOMETRY OF A POINT CLOUD

(71) Applicant: InterDigital VC Holdings, Inc., Wilmington, DE (US)

(72) Inventors: Celine Guede, Cesson-Sevigne (FR); Joan Llach Pinsach, Cesson-Sevigne (FR); Kangying Cai, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,489

(22) Filed: Oct. 25, 2023

(65) Prior Publication Data

US 2024/0073453 A1 Feb. 29, 2024

Related U.S. Application Data

(63) Continuation of application No. 17/945,672, filed on Sep. 15, 2022, now Pat. No. 11,838,547, which is a (Continued)

(30) Foreign Application Priority Data

Apr. 11, 2018 (EP) .................................... 18305438

(51) Int. Cl.
*H04N 19/103* (2014.01)
*H04N 19/147* (2014.01)
(Continued)

(52) U.S. Cl.
CPC ......... *H04N 19/597* (2014.11); *H04N 19/103* (2014.11); *H04N 19/147* (2014.11); *H04N 19/17* (2014.11)

(58) Field of Classification Search
CPC .. H04N 19/597; H04N 19/103; H04N 19/147; H04N 19/17; H04N 19/132;
(Continued)

(56) References Cited

U.S. PATENT DOCUMENTS 8,446,958 B2 5/2013 Kashiwagi et al.
8,606,028 B2 12/2013 Noda et al.
(Continued)

FOREIGN PATENT DOCUMENTS

CN 102224731 A 10/2011
CN 103621093 A 3/2014
(Continued)

OTHER PUBLICATIONS

Sullivan et al., "Report of the 8th meeting of the Joint Video Exploration Team (JVET)", Joint Video Exploration Team (JVET) of ITU-T SG 16 WP 3 and ISO/IEC JTC 1/SC 29/WG 11, Document: JVET-H1000-v1, Macao, China, Oct. 18-24, 2017, 76 pages.
(Continued)

*Primary Examiner* — Tat C Chio
(74) *Attorney, Agent, or Firm* — Condo Roccia Koptiw LLP

(57) ABSTRACT

The present principles relate to a method and device method for encoding depth values of orthogonally projected points of a point cloud onto a projection plane. The present principles also relate to a method and device for decoding a point cloud, a computer readable program and a video signal.

20 Claims, 7 Drawing Sheets

Related U.S. Application Data continuation of application No. 17/046,637, filed as application No. PCT/US2019/025142 on Apr. 1, 2019, now Pat. No. 11,477,481.

(51) Int. Cl.
*H04N 19/17* (2014.01)
*H04N 19/597* (2014.01)

(58) Field of Classification Search
CPC . H04N 19/20; G06T 2207/10028; G06T 9/00; G06T 7/50
See application file for complete search history.

(56) References Cited

U.S. PATENT DOCUMENTS

| | | | | |
|---|---|---|---|---|
| 9,918,068 | B2 | 3/2018 | Chang et al. | |
| 11,477,481 | B2 * | 10/2022 | Guede | H04N 19/597 |
| 11,838,547 | B2 * | 12/2023 | Guede | H04N 19/597 |
| 2011/0170602 | A1 * | 7/2011 | Lee | H04N 19/176 375/E7.123 |
| 2013/0106849 | A1 * | 5/2013 | Ha | G06T 5/77 382/260 |
| 2013/0222534 | A1 | 8/2013 | Rusanovskyy et al. | |
| 2014/0321546 | A1 | 10/2014 | Sakurai et al. | |
| 2015/0062370 | A1 * | 3/2015 | Shroff | G06T 7/571 348/222.1 |
| 2015/0124867 | A1 | 5/2015 | Jaeger et al. | |
| 2017/0251224 | A1 * | 8/2017 | Lee | H04N 19/187 |
| 2017/0347120 | A1 | 11/2017 | Chou et al. | |
| 2018/0332306 | A1 * | 11/2018 | Bang | H04N 19/597 |
| 2019/0087979 | A1 * | 3/2019 | Mammou | H04N 19/597 |
| 2020/0250798 | A1 | 8/2020 | Lasang et al. | |
| 2021/0174559 | A1 | 6/2021 | Nakagami et al. | |

FOREIGN PATENT DOCUMENTS

| | | | |
|---|---|---|---|
| CN | 103748881 | A | 4/2014 |
| CN | 104429062 | A | 3/2015 |
| CN | 106097334 | A | 11/2016 |
| CN | 106846382 | A | 6/2017 |
| CN | 107481313 | A | 12/2017 |
| EP | 1321893 | A2 | 6/2003 |
| KR | 20200141450 | A | 12/2020 |
| RU | 2433562 | C2 | 11/2011 |
| WO | 2013/159330 | A1 | 10/2013 |
| WO | 2014/043828 | A1 | 3/2014 |
| WO | 2019/055963 | A1 | 3/2019 |
| WO | 2019082958 | A1 | 5/2019 |
| WO | 2019142666 | A1 | 7/2019 |
| WO | 2019199726 | A1 | 10/2019 |

OTHER PUBLICATIONS

"English Language Abstract, CN Patent Publication No. 106097334 A".
"English Language Abstract, CN Patent Publication No. 106846382 A".
"English Language Abstract, CN Patent Publication No. 107481313A".
"English Language Translation, Russian Patent No. RU 2433562 C2".
Anonymous, , "Call for Proposals for Point Cloud Compression V2", ISO/IEC JTC1/SC29/WG11 MPEG2017/N16763, Hobart, Australia, Apr. 2017, 21 pages.
De Queiroz, Ricardo L. et al., "Compression of 3D Point Clouds using a Region-Adaptive Hierarchical Transform", IEEE Transactions on Image Processing; vol. 25, No. 8, Aug. 2016, 10 pages.
Guede, et al., "Geometry Image Coding Improvements", International Organization for Standardization, ISO/IEC JTC 1/SC29/WG11 MPEG/M42111, Coding of Moving Pictures and Audio, Gwangju, Korea, Jan. 2018, 15 pages.
ITU-T, , "Reference Software for ITU-T H.265 High Efficiency Video Coding", Recommendation ITU-T H.265.2, Series H: Audiovisual and Multimedia Systems, Infrastructure of Audiovisual Services—Coding of Moving Video, Oct. 2014, 12 pages.
Mammou, Khaled , "PCC Test Model Category 2 V0", ISO/IEC JTC1/SC29/WG11 N17248, Coding of Moving Picture and Audio, Macau, China, Oct. 2017, 11 pages.
Rosewarne, et al., "High Efficiency Video Coding (HEVC) Test Model 16 (HM16) Improved Encoder Description Update 7", JCTVC-Y1002, Editors, Joint Collaborative Team on Video Coding (JCT-VC) of ITU-T SG16 WP3 and ISO/IEC JTC1/SC29/WG11, 25th Meeting: Chengdu, China, Oct. 14-21, 2016, 70 pages.
Guede, et al., "PCC CE2.5 Report on optimizations for Depthlmagel geometry information", SO/IEC JTC1/SC29/WG11 m42626 Apr. 2018, San Diego, US, Apr. 2018, 20 pages.
Baroncini, et al., "JVET AHG report: CfP preparation (AHG1)", JVET-10001 Joint Video Exploration Team (JVET) of ITU-T SG 16 WP 3 and ISO/IEC JTC 1/SC 29/WG 11, Jan. 20-26, 2018, 3 pages.

* cited by examiner

METHOD AND DEVICE FOR CODING THE GEOMETRY OF A POINT CLOUD

CROSS REFERENCE TO RELATED APPLICATIONS

This application is a continuation of U.S. patent application Ser. No. 17/945,672, (now U.S. Pat. No. 11,838,547), which is a continuation of U.S. patent application Ser. No. 17/046,637, now U.S. Pat. No. 11,477,481, which is the national stage entry under 35 U.S.C. § 371 of International Application PCT/US2019/025142, filed Apr. 1, 2019, which was published in accordance with PCT Article 21(2) on Oct. 17, 2019, in English, and which claims the benefit of European Patent Application No. 18305438.6, filed Apr. 11, 2018.

FIELD

The present principles generally relate to coding and decoding of a point cloud representing the external surface of a 3D object. Particularly, but not exclusively, the technical field of the present principles are related to encoding/decoding of depth images representing the geometry of such a point cloud.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of data points in some coordinate system. In a three-dimensional coordinate system (3D space), these points are usually intended to represent the external surface of a 3D object. Each point of a point cloud is often defined by its location (X, Y, and Z coordinates in the 3D space) and possibly by other associated attributes such as a color, represented in the RGB or YUV color space for example, a transparency, a reflectance, a two-component normal vector, etc.

It is usual to represent a point cloud as a set of 6-components points (X, Y, Z, R, G, B) or equivalently (X, Y, Z, Y, U, V) where (X,Y,Z) defines the coordinates of a colored point in a 3D space and (R,G,B) or (Y,U,V) defines a color of this colored point.

Point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of set of points.

Practically, point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored and huge.

Automotive industry and autonomous car are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the Lidar as this attribute is a good information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

Point cloud compression will succeed in storing/transmitting 3D objects for immersive worlds only if the size of the bitstream is low enough to allow a practical storage/transmission to the end-user.

It is crucial to be able to distribute dynamic point clouds to the end-user with a reasonable consumption of bit-rate while maintaining an acceptable (or preferably very good) quality of experience. Efficient compression of these dynamic point clouds is a key point in order to make the distribution chain of immersive worlds practical.

Image-based point cloud compression techniques are becoming increasingly popular due to their combination of compression efficiency and low complexity. They proceed in two main steps: first, they project (orthogonal projection) the point cloud, i.e. the 3D points, onto 2D images. For example, at least one depth image represents the geometry of the point cloud, i.e. the spatial coordinates of the 3D points in a 3D space and at least one texture image represents an attribute associated with the 3D points of the point cloud, e.g. a texture/color information associated to those 3D points. Next, these techniques encode such depth and texture images with legacy video encoders.

Image-based point cloud compression techniques achieve good compression performance by leveraging the performance of 2D video encoder, like for example HEVC ("*ITU-T H.265 Telecommunication standardization sector of ITU (October 2014), series H: audiovisual and multimedia systems, infrastructure of audiovisual services—coding of moving video, High efficiency video coding, Recommendation ITU-T H.265*"), while at the same time, they keep complexity low by using simple projection schemes.

One of the challenges of image-based point cloud compression techniques is that a point cloud may not be suitable for projection onto images, especially when the point distribution follows a surface with many folds (concave/convex regions, like in clothing) or when the point distribution does not follow a surface at all (like in fur or hair). In these situations, image-based point cloud compression techniques suffer from low compression efficiency (many small projections are required, reducing the efficiency of the 2D video compression) or bad quality (due to the difficulty of projecting the point cloud onto a surface).

One of the approaches used in the state of the art to alleviate this problem consists in projecting multiple geometry and texture information onto a same spatial location (pixel) of an image. This means that several depth and/or texture images may be generated per 3D point of the point cloud.

This is the case, for example, of the so-called Test Model Category 2 point cloud encoder (TMC2) as defined in ISO/IEC JTC1/SC29/WG11/N17248, Macau, China, October 2017, in which the point cloud is orthogonally projected onto a projection plane. Two depth values are then associated per coordinate of said projection plane: one representative of the depth value associated with the nearest point (smallest depth value) and another representative of the depth value of the farthest point (largest depth value). A first depth image is then generated from the smallest depth values (D0) and a second depth image is generated from the difference between the largest (D1) and smallest (D0) depth values satisfying D1−D0<=SurfaceThickness, where SurfaceThickness is the maximum surface thickness.

The depth images and associated metadata are then encoded and decoded. The geometry of the point cloud is then reconstructed from the decoded depth images. Next, color/texture is assigned to each point of the reconstructed point cloud and texture images (here two) are generated from said assigned colors/textures. The two texture images are then encoded.

By this way, the second depth image contains significant contour-like high frequency features which are very hard to code.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for encoding depth values of orthogonally projected points of a point cloud onto a projection plane, comprising:

obtaining a first encoded depth image by encoding a first depth image in a bitstream, said first depth image representing depth values of nearer points of the point cloud;

determining and encoding, in the bitstream, a depth coding mode per image region, said depth coding mode indicating if depth values in an image region of a second depth image are also encoded in the bitstream, said second depth image representing depth values of farther points of the point cloud; and if at least one depth coding mode indicates that depth values in an image region of the second depth image are encoded in the bitstream, encoding at least partially the second depth image in the bitstream.

According to an embodiment, determining if depth values in an image region of the second depth image are encoded in the bitstream comprises:

obtaining a decoded first depth image by decoding the first encoded depth image and a decoded second depth image by encoding and decoding the second depth image; calculating a first rate-distortion cost by taking into account a first distance and a first bitrate, said first distance being calculated between depth values in a co-located image region of said decoded first depth image and depth values in a co-located image region of the decoded second depth image, said data rate being calculated for encoding said second depth image;

calculating a second rate-distortion cost by taking into account a second distance, the data rate being considered here as being null, said second distance being calculated between depth values of the co-located image region of said decoded first depth image and interpolated depth values obtained by interpolating depth values in said decoded first depth image;

if the second rate-distortion cost is lower than the first rate-distortion cost then the depth coding mode for said image region indicates that depth values in the co-located image region of the second depth image are not encoded in the bitstream, otherwise, the depth coding mode for said image region indicates that depth values in the co-located image region of the second depth image are encoded in the bitstream.

According to an embodiment, determining if depth values in an image region of the second depth image are encoded in the bitstream comprises:

calculating interpolated depth values for said image region of the second depth image by interpolating depth values in said first depth image;

calculating a distance between depth values in said image region of the second depth image and interpolated depth values obtained by interpolating depth values in a decoded first depth image obtained by decoding the first encoded depth image;

if the distance is lower than a threshold, then the depth coding mode for said image region indicates that the depth values in said image region of the second depth image are not encoded in the bitstream, otherwise, the depth coding mode for said image region indicates that depth values in said image region of the second depth image are encoded in the bitstream.

According to an embodiment, the above first and the second distance or the above distance is computed between at least a part of a reconstructed point cloud and the corresponding part of the point cloud, said at least part of the point cloud being reconstructed from the decoded first depth image and a second depth image.

According to an embodiment, said at least part of the point cloud is reconstructed from depth values in said image region and from depth values in at least one previously considered image region.

According to an embodiment, if the depth coding mode for said image region indicates that depth values in said image region of the second depth image are not encoded in the bitstream, depth values of pixels in said image region of the second depth image are replaced by a constant value before encoding, at least partially, the second depth image.

According to an embodiment, the depth coding mode is encoded as a metadata associated with the reconstruction of the point cloud whose geometry is represented by said first and second depth images.

The present principles set out to remedy at least one of the drawbacks of the prior art with a method for decoding depth values of orthogonally projected points of an original point cloud onto a projection plane, comprising:

obtaining a decoded first depth image by decoding a bitstream;

obtaining a depth coding mode associated with an image region of a decoded second depth image from the bitstream;

if the depth coding mode indicates that the depth values in said image region of the decoded second depth image are encoded in the bitstream, decoding at least partially the second depth image from the bitstream, otherwise, calculating interpolated depth values in said image region of the decoded second depth image by interpolating depth values in the decoded first depth image.

According to an embodiment, the whole second depth image is encoded/decoded in/from the bitstream when at least one depth coding mode indicates that the depth values in an image region of the second depth image are encoded/decoded in the bitstream.

According to an embodiment, the size and shape of an image region of the second depth image are the size and shape of said second depth image. According to other of their aspects, the present principles relate to a device, a computer program product, a non-transitory computer-readable medium, and a video signal.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated. It shows.

Similar or same elements are referenced with the same reference numbers.

DETAILED DESCRIPTION

Figure 1:
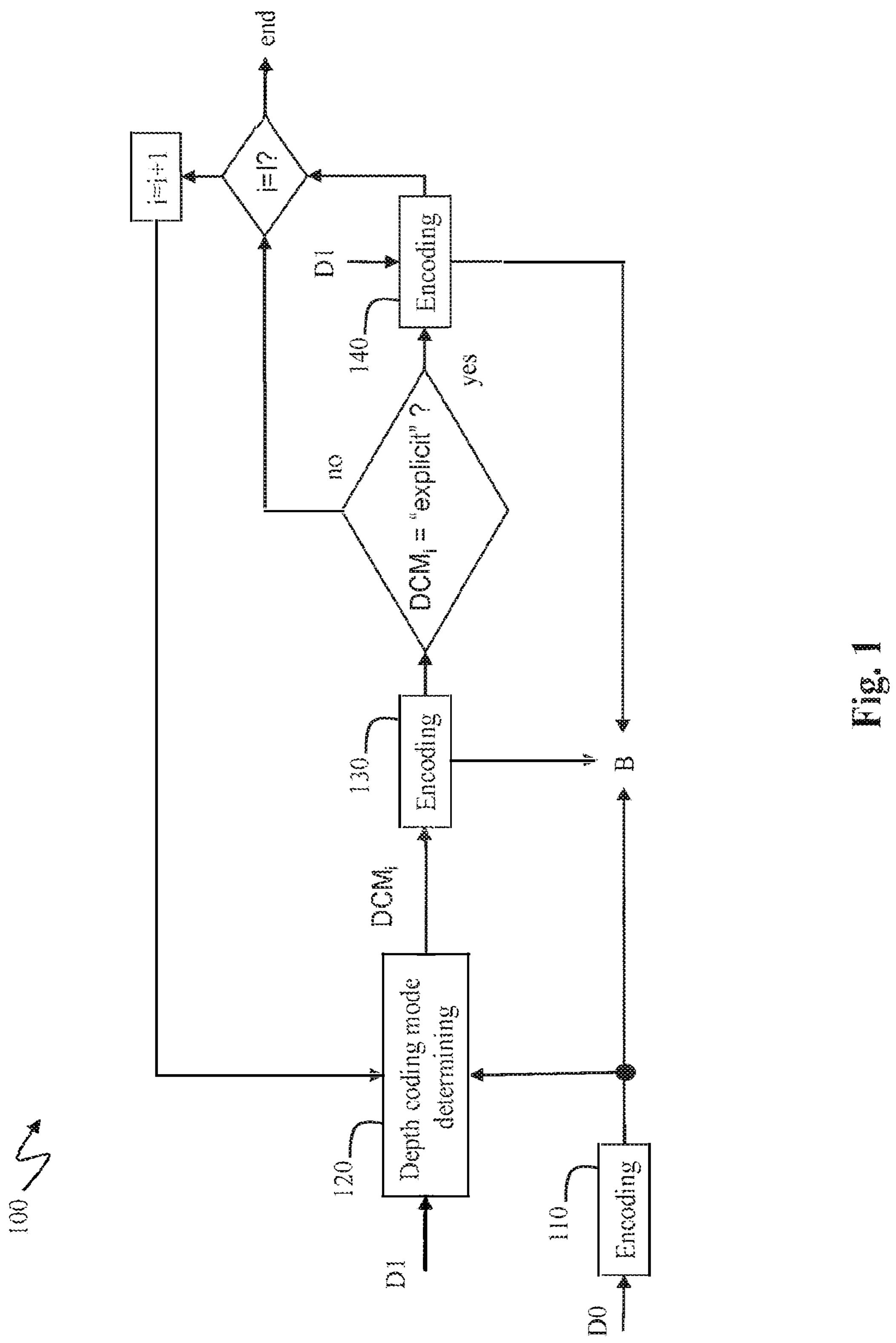
FIG. 1 shows schematically a diagram of the steps of the method for encoding the geometry of a point cloud represented by a first and a second depth images in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms “a”, “an” and “the” are intended to include the plural forms as well, unless the context clearly indicates otherwise. It will be further understood that the terms “comprises”, “comprising,” “includes” and/or “including” when used in this specification, specify the presence of stated features, integers, steps, operations, elements, and/or components but do not preclude the presence or addition of one or more other features, integers, steps, operations, elements, components, and/or groups thereof. Moreover, when an element is referred to as being “responsive” or “connected” to another element, it can be directly responsive or connected to the other element, or intervening elements may be present. In contrast, when an element is referred to as being “directly responsive” or “directly connected” to other element, there are no intervening elements present. As used herein the term “and/or” includes any and all combinations of one or more of the associated listed items and may be abbreviated as “/”.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to “in accordance with an example” or “in an example” means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding the geometry of a point cloud from two depth images but extends to the encoding/decoding of a sequence of point clouds (temporally dynamic point cloud) because the geometry of the sequence of point clouds is encoded/decoded by/from two sequences (video) of depth images, the two depth images associated with a point cloud being encoded independently of the two depth images of another point cloud of the sequence.

As explained above, a point cloud is orthogonally projected onto a projection plane and two depth images D0 and D1 are obtained from the depth values associated with said projected 3D points. D0 is the first depth image that represents the depth values of the nearest points of the point cloud and D1 is the second depth image that represents the depth values of farthest points of the point cloud. The first depth image D0 is encoded using for example a legacy image/video encoder.

In the following, the term "image region" designates a set of pixels of an image. These pixels may or not be adjacent pixels but all of them share at least one common property.

For example, an image itself may be considered as being an image region. An image may also be split into multiple block and a block is then an image region.

An image region may also have a non-rectangular shape. This is the case, for example, when pixels of an image which have a same (or similar) extracted feature are associated to form an image region.

Examples of feature extracted from an image may be a color, texture, normal vector, etc. . . . .

FIG. 1 shows schematically a diagram of the steps of the method 100 for encoding the geometry of a point cloud represented by a first (D0) and a second (D1) depth images in accordance with an example of the present principles.

In step 110, the first depth image D0 is encoded in a bitstream B.

In step 120, a module determines a depth coding mode $DCM_i$ per image region, said depth coding mode indicating if the depth values of pixels in an image region of the second depth image D1 are also encoded in the bitstream B. This depth coding mode is denoted the "explicit" mode in the following.

In step 130, a module encodes said depth coding mode $DCM_i$ in the bitstream B.

In step 140, if at least one depth coding mode $DCM_i$ indicates that the depth values of pixels in an image region of the second depth image D1 are encoded in the bitstream B ("explicit" mode), a module encodes at least partially the second depth image D1 in the bitstream B.

The steps 130 and 140 are repeated until each of the I image regions has been considered.

According to the present principles, an additional depth coding mode is encoded in a bitstream to indicate if an image region of the second depth image D1 is explicitly (or implicitly) encoded in the bitstream. When a depth coding mode associated with an image region of the second depth image D1 indicates that the depth values of pixels in that image region are not encoded in the bitstream ("implicit" mode), the bit rate is decreased compared to the effective transmission of coded data representative of said depth values as disclosed in prior art. Thus, transmitting such a depth coding mode per image region increases the coding efficiency of the depth images representing the geometry of a point cloud.

According to an embodiment, the size and shape of an image region of the second depth image are the size and shape of said second depth image, i.e the image region is the image itself.

A single depth coding mode is then transmitted to indicate if the whole second depth image is (or not) encoded in the bitstream.

According to step 140, the whole second depth image D1 is encoded in the bitstream B when at least one depth coding mode $DCM_i$ is set to "explicit" mode.

According to another embodiment, a depth coding mode is assigned to each image region of the second depth image.

Said image region may have a rectangular shape, e.g. a block of the image, or a non-rectangular shape such as projected depth patches in TMC2.

These embodiments improve the coding efficiency by adapting locally the depth coding mode to the characteristics of the image content.

Figure 2:
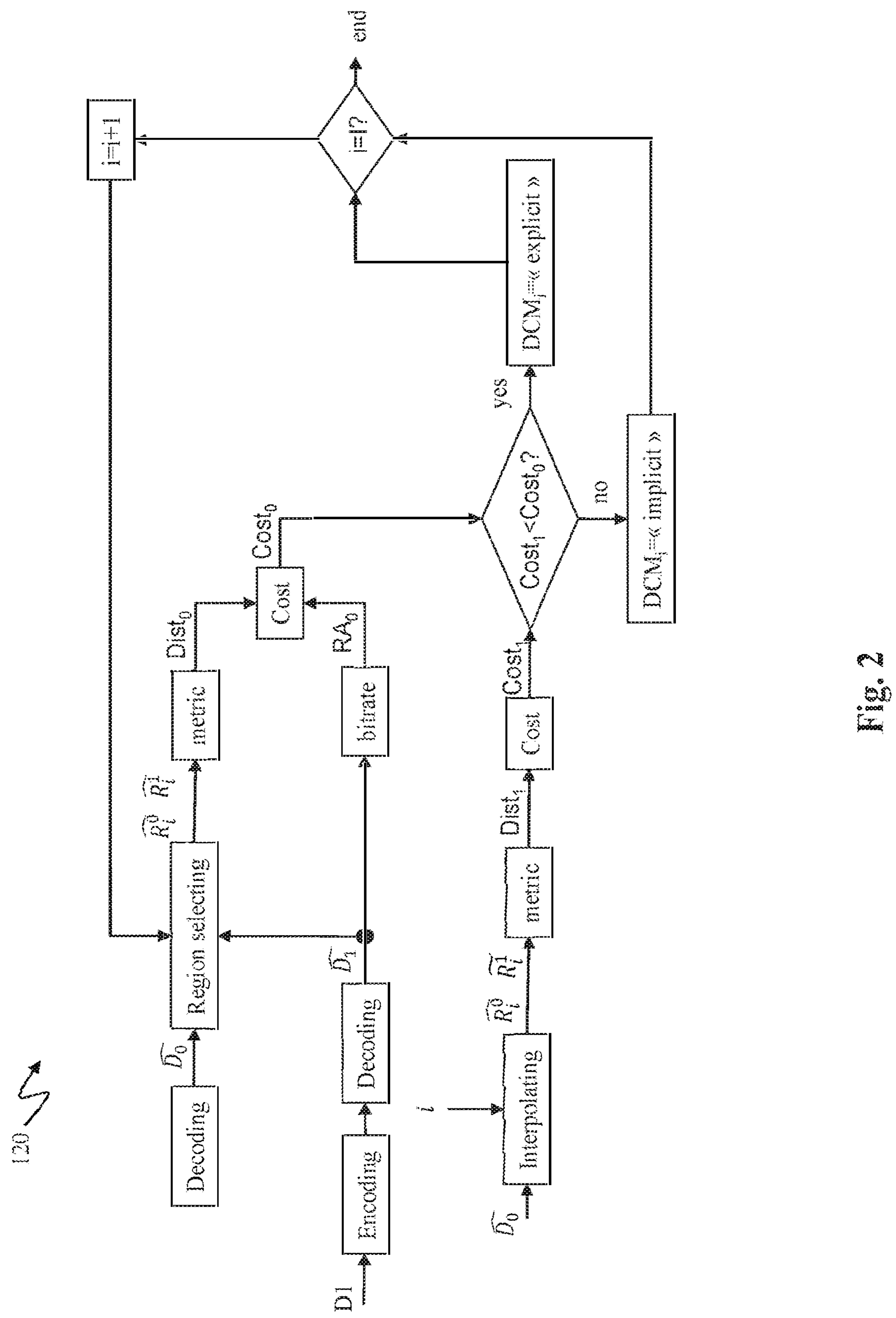
FIG. 2 shows schematically a diagram of the step 120 of the method of FIG. 1 in accordance with an embodiment of the present principles.

According to an embodiment of step 120, as illustrated in FIG. 2, determining if the depth values of pixels in an image region of the second depth image D1 are encoded in the bitstream comprises the following steps.

A module obtains a decoded first depth image $\widehat{D_0}$ by decoding the first encoded depth image, and a decoded second depth image $\widehat{D_1}$ by encoding and decoding the second depth image D1.

A current image region of said decoded first depth image $\widehat{D_0}$ is considered. The depth values of pixels in said current image region is a set of depth values noted $\widehat{R_i^0}$. A first quality metric $Dist_0$ is calculated between the depth values of pixels in said current image region $\widehat{R_i^0}$ and the depth values of co-located pixels in the decoded second depth image $\widehat{D_1}$, i.e the depth values of pixels in a co-located image region of the decoded second depth image, said set of depth values being denoted $\widetilde{R_i^1}$. A data rate $RA_0$ for encoding said second depth image D1 is also calculated.

A first rate-distortion cost $Cost_0$ is then calculated by taking into account said first distance $Dist_0$ and said first bitrate $RA_0$.

A module calculates interpolated depth values for the pixels of the co-located image region of the decoded second depth image $\widehat{D_1}$ by interpolating depth values of pixels in said decoded first depth image $\widehat{D_0}$. The set of interpolated depth values is denoted $\widehat{R_i^1}$.

A second quality metric $Dist_1$ is calculated between the depth values of pixels in said current image region $\widehat{R_i^0}$ and the interpolated depth values $\widehat{R_i^1}$.

A second rate-distortion cost $Cost_1$ is then calculated by taking into account said second distance $Dist_1$, the data rate being considered here as being null because the second depth image is not encoded (transmitted).

If the second rate-distortion cost $Cost_1$ is lower than the first rate-distortion cost $Cost_0$ then the depth coding mode $DCM_i$ for the current image region i is set to "implicit", i.e. indicates that the depth values in the current image region of the second depth image D1 are not encoded in the bitstream. Otherwise, the depth coding mode $DCM_i$ for the current image region i is set to "explicit", i.e. indicates that the depth values in the current image region the second depth image D1 are encoded in the bitstream.

The steps of this embodiment are repeated until each of the I image regions has been considered.

This embodiment of step 120 provides the best rate-distortion tradeoff for determining whether (or not) the depth values of pixels in an image region of a second depth image are encoded in a bitstream.

Figure 3:
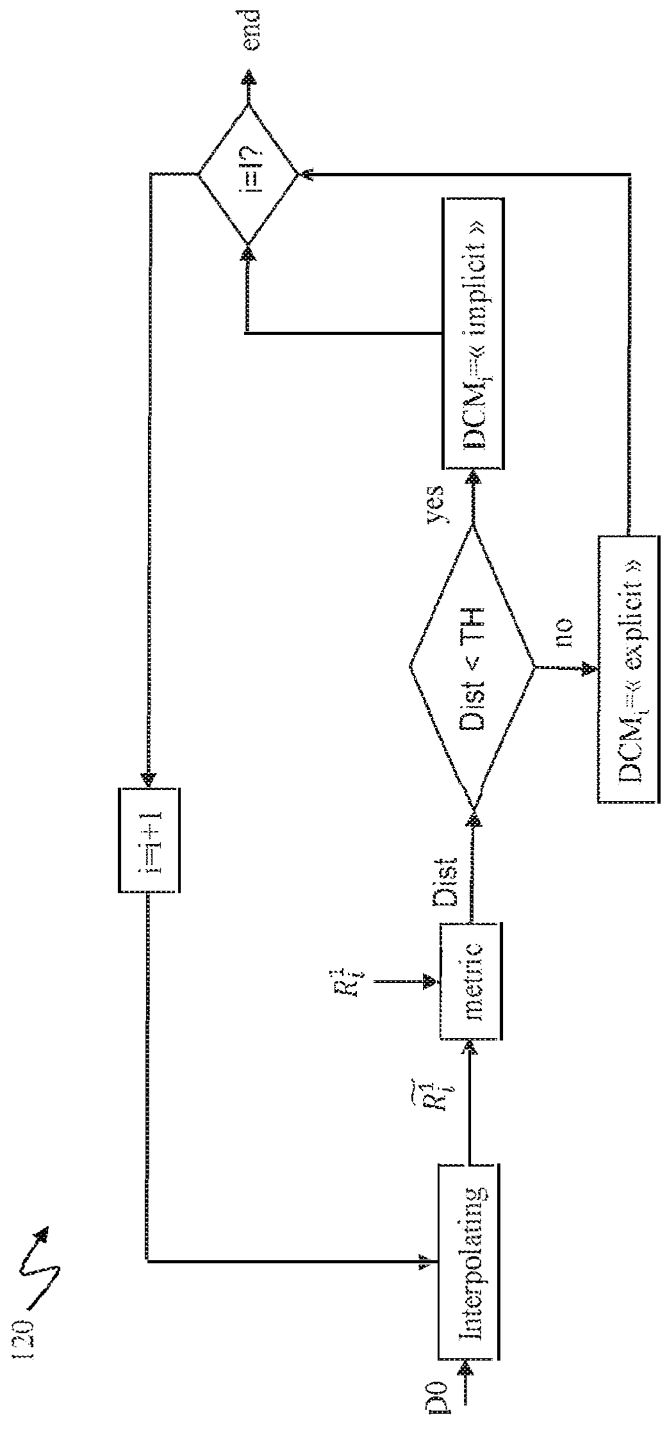
FIG. 3 shows schematically a diagram of the step 120 of the method of FIG. 1 in accordance with an embodiment of the present principles.
Figure 3:

According to an alternative embodiment of step 120, as illustrated in FIG. 3, determining if the depth values of pixels in an image region of the second depth image D1 are encoded in the bitstream comprises the following steps.

A module calculates interpolated depth values for the pixels of the co-located image region of the second depth image D1 by interpolating depth values of pixels in said first depth image D0. The set of interpolated depth values is denoted $\widehat{R_i^1}$.

A distance DIST is then calculated between the depth values in a current image region i of the second depth image D1, denoted $$R_i^1,$$

and said interpolated depth values $\widehat{R_i^1}$.

If the distance DIST is lower than a threshold TH, then the depth coding mode $DCM_i$ for the current image region i is set to "implicit", i.e. indicates that the depth values in the current image region of the second depth image D1 are not encoded in the bitstream. Otherwise, the depth coding mode $DCM_i$ for the current image region i is set to "explicit", i.e. indicates that the depth values in the current image region of the second depth image D1 are encoded in the bitstream.

The steps of this embodiment are repeated until each of the I image regions has been considered.

This alternative embodiment of step 120 provides a sub-optimal rate-distortion trade-off because the metric is calculated without encoding/decoding process but decreases the complexity of the selecting process compared to the complexity of the above optimal embodiment of FIG. 2.

According to an embodiment, a distance DIST between two set of ordered depth values A and B is a distance defined by:

$$DIST = \sum_{j=1}^{J} (A_j - B_j)^2$$

where $A_j$, respectively $B_j$, designates the $j^{th}$ depth value of the ordered set A, respectively B, of J depth values.

Ordering a set of values means that the depth values $A_j$ and $B_j$ represents different depth values of co-located pixels in two distinct depth images.

A distance DIST is not limited to this embodiment and may extend to any other well-known metric for computing a distance between two set of J values, such as, for example, the sum of absolute differences, an average/maximum/minimum of the differences, etc. . . . .

According to an embodiment, a distance DIST is computed between at least a part of a reconstructed point cloud and the corresponding part of the original point cloud.

As an example, the distance DIST is defined by ISO/IEC JTC1/SC29/WG1 MPEG2017/N16763, Hobart, April 2017, Annex B.

Said at least part of the point cloud is reconstructed from the decoded first depth image and a second depth image.

According to an embodiment, said at least part of the point cloud is reconstructed from depth values of pixels in an image region.

According to an embodiment, said at least part of the point cloud is reconstructed from depth values of pixels in a current image region and from depth values of pixels in at least one previously considered image region.

For example, according to this embodiment, a "temporary" second depth image is initialized with a constant value. Then, the depth values of pixels of said temporary second depth image are iteratively either replaced by depth values of encoded/decoded second depth image when a current image region is encoded explicitly ("explicit" mode), or by padding the depth value of the nearest neighboring point previously encoded according to the "explicit" mode.

Thus, the reconstructed point cloud that depends on the encoding of depth values of pixels in previously considered image regions becomes similar to the reconstructed point cloud.

Note that in this embodiment, the "temporary" depth image is not encoded in the bitstream. The second depth image is still encoded according to the method of FIG. 1.

According to an embodiment of step 140, if the depth coding mode $DCM_i$ associated with an image region is set to "implicit", the depth values of pixels in said image region of the second depth image are replaced by a constant value before encoding, at least partially, the second depth image D1.

According to an embodiment, the depth coding mode DCMi is encoded as a metadata associated with the reconstruction of the point cloud whose geometry is represented by said first and second depth images.

Figures 5, 6:
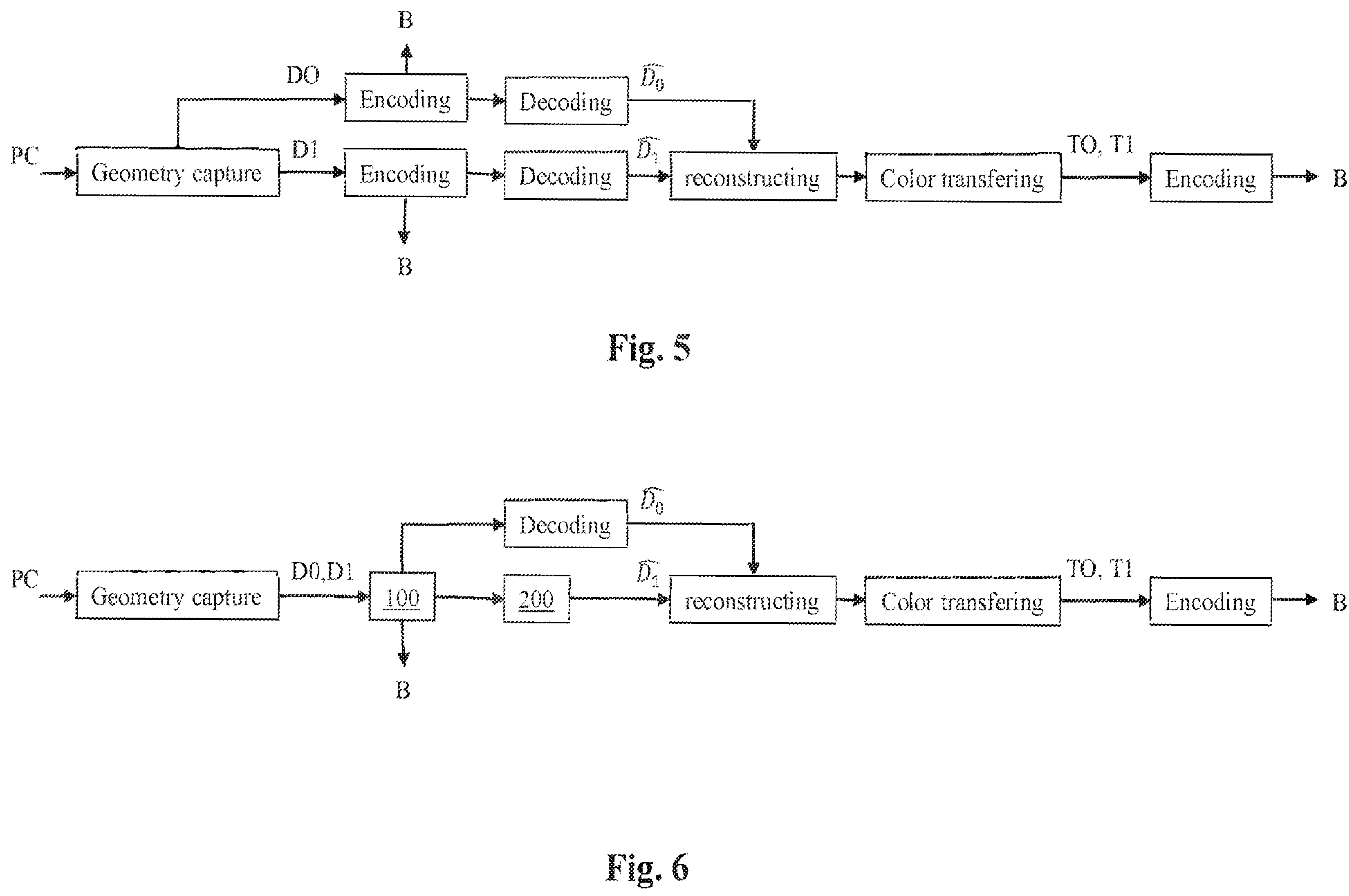
FIG. 5 shows schematically the method for encoding the geometry and texture of a point cloud as defined in prior art (TMC2)
FIG. 6 shows schematically an example of use of the methods 100 and 200 in the encoding method of FIG. 5.

Said metadata may be associated, for example with each image, common to the two images or with each image region, and are used for reconstructing the geometry of a point cloud both at the encoding and decoding side as further explained in relation with FIGS. 5 and 6.

According to an embodiment, the depth coding mode DCMi is encoded as a syntax element of a SEI message, for example, attached to a NAL unit associated to the first depth image D0.

Example of DCM in a SEI Message in HEVC

| | Descriptor |
|---|---|
| Syntax | |
| dcm_info( payloadSize ) { | |
| dcm_mode | u(8) |
| } | |

dcm_mode contains an identifying number that is used to identify the depth coding mode. When dcm_mode equals to 0 it means, for example, the "explicit" mode, when 1 means "implicit" mode.

According to a variant, the depth coding mode could be also in a SPS or PPS message.

According to another embodiment, the depth coding mode DCMi is encoded as a watermark embedded in the depth images.

As a variant, the depth coding mode DCMi is embedded as a visible watermark in an empty area of the first depth image D0.

For example, block of N×N pixels in a pre-defined corner of the first depth image D0: all the pixels of such block are set to a same binary value, for example, 0 (1) to indicate that a depth coding mode DCMi is set to "explicit" ("implicit").

At the decoder, an average value of the block is then calculated and if said average is closer to 0 than to a maximum value (all the pixel values equal to 1) then the decoded block indicates that the "explicit" mode is used, otherwise, it indicates the "implicit" mode is used.

According to another embodiment, the depth coding mode DCMi would be added to the binary information of a metadata associated to the geometry of the point cloud represented by the first and the second depth images, such as the occupancy map as defined in TMC2.

This embodiment is better suited to specify the depth coding mode DCMi at finer resolution than per image.

Let's see more in detail how this is implemented in TMC2. The top-level syntax of the current version of TMC2 is shown in Table 1 and Table 2. Table 3 provides the syntax of the encapsulation of the geometry (depth) and texture (color) streams. Table 4 and Table 5 describe the detailed syntax for the occupancy map and block to patch index decoding. And Table 6 describes the syntax for the arithmetic coding of elementary values.

TABLE 1

| Bitstream header | |
|---|---|
| Magic Number | ReadUint32 |
| Version | ReadUint32 |
| Total size | ReadUint64 |
| Group OfFrames × N | ReadGroupOfFrames |

TABLE 2

| GroupOf Frames header | |
|---|---|
| Size | ReadUint8 |
| Width | ReadUint16 |
| Height | ReadUint16 |
| Occupancy resolution | ReadUint8 |
| radius2Smoothing | ReadUint8 |
| neighborCountSmoothing | ReadUint8 |
| radius2BoundaryDetection | ReadUint8 |
| thresholdSmoothing | ReadUint8 |
| losslessGeo | ReadUint8 |
| losslessTexture | ReadUint8 |
| noAttributes | ReadUint8 |
| Geometric video bitstream | ReadVideo( ) |
| Occupancy maps × M | ReadOccupancyMap( ) |
| Texture video bitstream | ReadVideo( ) |

TABLE 3

| ReadVideo( ) function | |
|---|---|
| Size of the video bit stream | ReadUint32 |
| Read video bitstream | ReadUint8 × size |

TABLE 4

| ReadOccupancyMap( ) function | |
|---|---|
| Patch count | ReadUint32 |
| Occupancy precision | ReadUint8 |
| Max candidate count | ReadUint8 |
| Bit Count U0 | ReadUint8 |
| Bit Count V0 | ReadUint8 |
| Bit Count U1 | ReadUint8 |
| Bit Count V1 | ReadUint8 |
| Bit Count D1 | ReadUint8 |
| Arithmetic bitstream size | ReadUint32 |
| Arithmetic bitstream | ReadArithmetic( ) |

TABLE 5

| ReadArithmetic( ) function | |
|---|---|
| For all patches | |
| U0 | DecodeUInt32(bitCountU0) |
| V0 | DecodeUInt32(bitCountV0) |
| U1 | DecodeUInt32(bitCountU1) |
| V1 | DecodeUInt32(bitCountV1) |
| D1 | DecodeUInt32(bitCountD1) |
| deltaSizeU0 | DecodeExpGolomb( ) |

TABLE 5-continued

| ReadArithmetic( ) function | |
|---|---|
| deltaSizeV0 | DecodeExpGolomb( ) |
| // Block to patch index decoding | |
| For all blocks | |
| If number of candidate patches > 1 | |
| Candidate index | Decode |
| If Candidate index == maxCandidateCount | |
| block to patch index | DecodeUInt32(bitCountPatch) |
| Else | |
| Block to patch index = Candidate index | |
| // Occupancy map decoding | |
| For all blocks | |
| If Block to patch index > 0 | |
| isFull | decode |
| If not Full | |
| bestTraversalOrderIndex | decode |
| runCountMinusTwo | decode |
| Occupancy | decode |
| for (size_t r = 0; r < runCountMinusOne; ++r) | |
| { | |
| runLength | decode |
| for (size_t j = 0; j <= runLength; ++j) | |
| Block[ traversalOrder[ i++] ] = occupancy; | |
| occupancy = !occupancy; | |
| } | |
| For all remaining blocks | |
| Block[ traversalOrder[ i++ ] ] = occupancy; | |

The current syntax encodes the per-block metadata in two steps: first coding the block to patch index for all blocks of the patch image, then coding the occupancy map for those blocks belonging to a patch.

The block to patch index defines the index of the patch associated to each block of the texture and depth images, the blocks forming a regular, square grid. The size of the block is given by the "Occupancy resolution" parameter in the header of the group of frames, and typically set to 16 pixels.

The occupancy map, which indicates what pixels from the texture and depth images represent the point cloud to be reconstructed, is also coded per block. In this case, the blocks form a grid within each "Occupancy resolution" block, the grid being of size "Occupancy precision" and typically set to 4 pixels.

Example of DCM Mode Encoded as Metadata

Example of DCM in the Occupancy Map (Per Image (Frame))—Modification of Table 5

TABLE 6

| ReadArithmetic( ) function | |
|---|---|
| For all patches | |
| U0 | DecodeUInt32(bitCountU0) |
| V0 | DecodeUInt32(bitCountV0) |
| U1 | DecodeUInt32(bitCountU1) |
| V1 | DecodeUInt32(bitCountV1) |
| D1 | DecodeUInt32(bitCountD1) |
| deltaSizeU0 | DecodeExpGolomb( ) |
| deltaSizeV0 | DecodeExpGolomb( ) |
| dcm_mode | ReadUint8 |
| // Block to patch index decoding | |
| For all blocks | |
| If number of candidate patches > 1 | |
| Candidate index | Decode |
| If Candidate index == maxCandidateCount | |
| block to patch index | DecodeUInt32(bitCountPatch) |
| Else | |
| Block to patch index = Candidate index | |
| // Occupancy map decoding | |
| For all blocks | |
| If Block to patch index > 0 | |
| isFull | decode |
| If not Full | |
| bestTraversalOrderIndex | decode |
| runCountMinusTwo | decode |
| Occupancy | decode |

TABLE 6-continued

ReadArithmetic( ) function

```
        for (size__tr = 0; r < runCountMinusOne;
++r)
        {
           runLength                                    decode
           for (size__t j = 0; j <= runLength; ++j)
              Block[ traversalOrder[ i++ ] ] =
occupancy;
           occupancy = !occupancy;
        }
        For all remaining blocks
           Block[ traversalOrder[ i++ ] ] =
occupancy;
```

According to an embodiment, the depth coding modes $DCM_i$ associated to image regions are binary values of a sequence of binary values, where each binary value indicates a depth coding modes $DCM_i$ for an image region. For example, '0' indicates the "implicit" mode and '1' indicates the "explicit" mode.

According to an embodiment, entropy or Run-length coding methods may be used to encode the sequence of binary.

Figure 4:
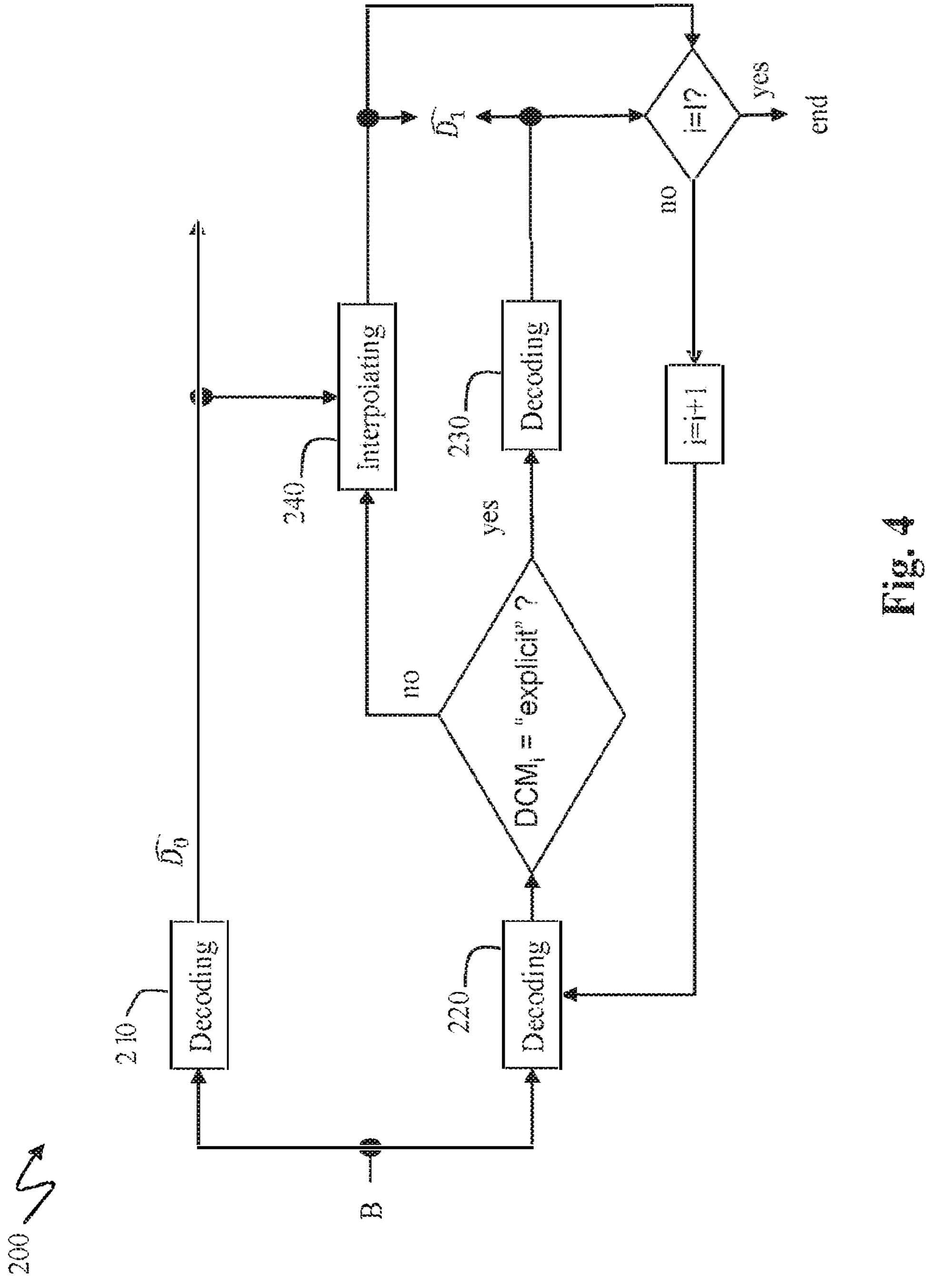
FIG. 4 shows schematically a diagram of the steps of the method for decoding the geometry of a point cloud from a first and a second depth images representing different depth values of orthogonally projected points of an original point cloud in accordance with an example of the present principles.

FIG. 4 shows schematically a diagram of the steps of the method 200 for decoding the geometry of a point cloud from a first (D0) and a second (D1) depth images representing different depth values of orthogonally projected points of an original point cloud in accordance with an example of the present principles.

In step 210, a decoded first depth image is obtained by decoding a bitstream B.

In step 220, a depth coding mode $DCM_i$ associated with a current image region i of a decoded second depth image is decoded from the bitstream B.

In step 230, if the depth coding mode $DCM_i$ indicates that the depth values of pixels in said current image region of the decoded second depth image D1 are encoded in the bitstream B ("explicit" mode), a module decodes at least partially the second depth image D1 from the bitstream B.

Otherwise, in step 240, a module calculates interpolated depth values for the pixels of the image region of the decoded second depth image $\widehat{D_1}$ by interpolating depth values of pixels in the decoded first depth image $\widehat{D_0}$.

The steps 220-240 are repeated until each of the I image regions has been considered.

The geometry of the point cloud is then reconstructed by deprojecting the decoded first ($\widehat{D_0}$) and second ($\widehat{D_1}$) depth images as defined, for example, in TMC2.

According to an embodiment of the method, calculating interpolated depth values for the pixels of an image region of a second depth image by interpolating depth values of pixels in a first depth image comprises:

- Determining a co-located pixel in the first depth image for each current pixel of said image region of the second depth image;
- Determining at least one neighboring pixel of said co-located pixel in the first depth image;
- Calculating an interpolated depth value for each current pixel taking into account said at least one neighboring pixel in the first depth image.

According to an embodiment, the spatial distance between the co-localized pixel in the first depth image and said at least one neighboring pixel is below a given threshold.

According to an embodiment, the interpolated depth value of a current pixel in an image region of the second depth image is the depth value of the closest neighboring pixel among said at least one neighboring pixel in the first depth image. According to an embodiment, the interpolated depth value of a current pixel in an image region of the second depth image is the maximum depth value of said at least one neighboring pixel in the first depth image.

According to an embodiment, the interpolated depth value of a current pixel in an image region of the second depth image is the minimum depth value of said at least one neighboring pixel in the first depth image.

According to an embodiment, the interpolated depth value of a current pixel in an image region of the second depth image is the average of the depth values of said at least one neighboring pixel in the first depth image.

FIG. 5 shows schematically the method for encoding the geometry and texture of a point cloud as defined in TMC2.

Basically, the encoder captures the geometry information of an original point cloud PC in a first (D0) and a second (D1) depth images.

As an example, the first and second depth images are obtained as follows in TMC2.

Depth patches (set of 3D points of the point cloud PC) are obtained by clustering the points of the point cloud PC according to the normal vectors at these points. All the extracted depth patches are then projected onto a 2D grid and packed while trying to minimize the unused space, and guaranteeing that every T×T (e.g., 16×16) block of the grid is associated with a unique patch, where T is a user-defined parameter that signaled into the bitstream.

Depth images are then generated by exploiting the 3D to 2D mapping computed during the packing process, more specifically the packing position and size of the projected area of each patch. More precisely, let H(u,v) be the set of points of the current patch that get projected to the same pixel (u, v). A first layer, also called the nearest layer or the first depth image D0, stores the point of H(u,v) with the smallest depth value. The second layer, referred to as the farthest layer or the second depth image D1, captures the point of H(u,v) with the highest depth value within the interval [D, D+Δ], where D is a depth value of pixels in the first depth image D0 and Δ is a user-defined parameter that describes the surface thickness.

A first depth image D0 then outputs the packing process. A padding process is also used to fill the empty space between patches in order to generate a piecewise smooth first depth image suited for video compression.

The generated depth images/layers D0 and D1 are then stored as video frames and compressed using any legacy video codec such as HEVC.

The encoder also captures the texture information of the original point cloud PC in a two texture images by encoding/decoding the first and second depth images and reconstructing the geometry of the point cloud by deprojecting said decoded first and second depth images $\widehat{D_0}, \widehat{D_1}$. Once reconstructed, a color is assigned (color transferring) to each point of the reconstructed point cloud from the color information of the original point cloud PC in a manner of minimizing color information coding error.

According to one embodiment, for each reconstructed point, the color of its nearest point in the original point cloud is assigned as its color to be coded.

A first and a second texture images T0, T1 are then generated by storing the color information to be coded of each reconstructed point in the same position as in the depth images, i.e. (i,u,v).

FIG. 6 shows schematically an example of use of the methods 100 and 200 in the encoding method of FIG. 5.

According to this example, the encoding of the first depth image $\widehat{D_0}$ and the encoding of the second depth image $\widehat{D_1}$ of FIG. 5 are replaced by the encoding method 100 of FIG. 1, and the decoding of the second depth image $\widehat{D_1}$ of FIG. 5 is replaced by the decoding method 200 of FIG. 4.

Figures 7, 8:
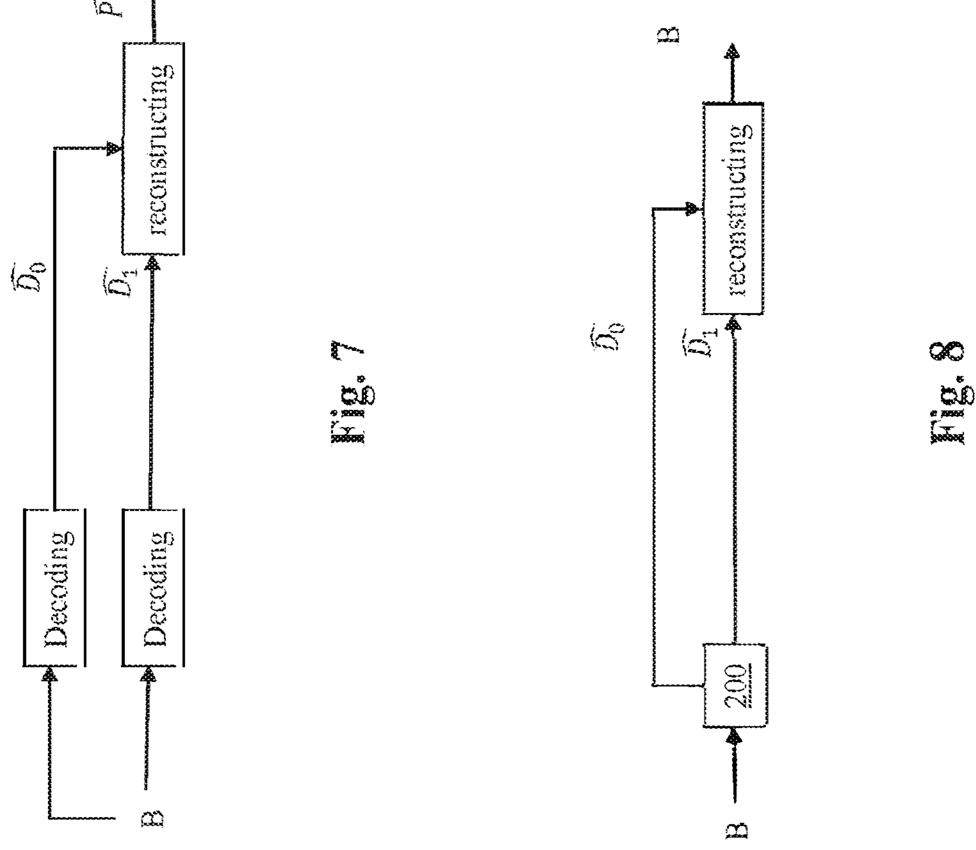
FIG. 7 shows schematically the method for decoding the geometry and texture of a point cloud as defined in prior art (TMC2)
FIG. 8 shows schematically an example of use of the method 200 in the decoding method of FIG. 7.

FIG. 7 shows schematically the method for decoding the geometry and texture of a point cloud as defined in prior art (TMC2).

A decoded first depth image $\widehat{D_0}$ and a decoded second depth image $\widehat{D_1}$ are obtained by decoding the bitstream B. Possibly metadata are also decoded to reconstruct the geometry of the point cloud $\widehat{PC}$.

The geometry of the point cloud is thus reconstructed by deprojection said decoded first and second depth images and possibly said metadata.

FIG. 8 shows schematically an example of use of the method 200 in the decoding method of FIG. 7.

According to this example the decoding of the first and second depth images of FIG. 7 is replaced by the decoding method of FIG. 4.

On FIG. 1-8, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figures 9, 10, 11:
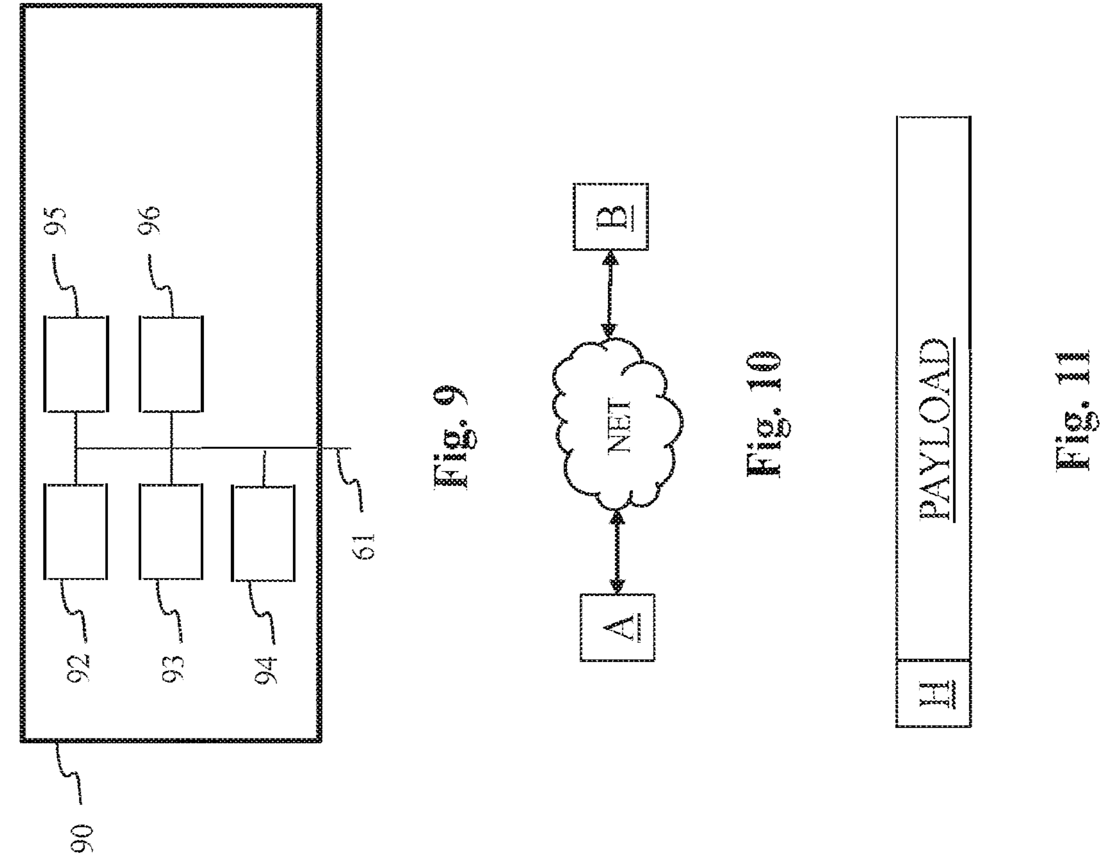
FIG. 9 shows an example of an architecture of a device in accordance with an example of present principles.
FIG. 10 shows two remote devices communicating over a communication network in accordance with an example of present principles.
FIG. 11 shows the syntax of a signal in accordance with an example of present principles.

FIG. 9 represents an exemplary architecture of a device 90 which may be configured to implement a method described in relation with FIG. 1-8.

Device 90 comprises following elements that are linked together by a data and address bus 91:

- a microprocessor 92 (or CPU), which is, for example, a DSP (or Digital Signal Processor);
- a ROM (or Read Only Memory) 93;
- a RAM (or Random Access Memory) 94;
- an I/O interface 95 for reception of data to transmit, from an application; and
- a battery 96.

In accordance with an example, the battery 96 is external to the device. In each of mentioned memory, the word «register» used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

RAM 94 comprises, in a register, the program executed by the CPU 92 and uploaded after switch on of the device 90, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the ppoint cloud PC is obtained from a source. For example, the source belongs to a set comprising:

- a local memory (93 or 94), e.g. a video memory or a RAM (or Random Access Memory), a flash memory, a ROM (or Read Only Memory), a hard disk;
- a storage interface (95), e.g. an interface with a mass storage, a RAM, a flash memory, a ROM, an optical disc or a magnetic support;
- a communication interface (95), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded first and/or second depth images or the reconstructed point cloud is (are) sent to a destination; specifically, the destination belongs to a set comprising:

- a local memory (93 or 94), e.g. a video memory or a RAM, a flash memory, a hard disk;
- a storage interface (95), e.g. an interface with a mass storage, a RAM, a flash memory, a ROM, an optical disc or a magnetic support;
- a communication interface (95), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the bitstream B is sent to a destination. As an example, the bitstream B is stored in a local or remote memory, e.g. a video memory (94) or a RAM (94), a hard disk (93). In a variant, one or both bitstreams are sent to a storage interface (95), e.g. an interface with a mass storage, a flash memory, ROM, an optical disc or a magnetic support and/or transmitted over a communication interface (95), e.g. an interface to a point to point link, a communication bus, a point to multipoint link or a broadcast network.

In accordance with examples of decoding or decoder, the bitstream B is obtained from a source. Exemplarily, the bitstream is read from a local memory, e.g. a video memory (94), a RAM (94), a ROM (93), a flash memory (93) or a hard disk (93). In a variant, the bitstream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, device 90 being configured to implement an encoding method described in relation with FIG. 1-3, or 5-6, belongs to a set comprising:

- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 90 being configured to implement a decoding method described in relation with FIG. 4 or 7-8, belongs to a set comprising:

- a mobile device;
- a communication device;
- a game device;
- a set top box;
- a TV set;
- a tablet (or tablet computer);
- a laptop;
- a display and
- a decoding chip.

According to an example of the present principles, illustrated in FIG. 10, in a transmission context between two remote devices A and B over a communication network NET, the device A comprises a processor in relation with memory RAM and ROM which are configured to implement a method for encoding the geometry of a point cloud as described in relation with the FIG. 1-3, or 5-6 and the device B comprises a processor in relation with memory RAM and ROM which are configured to implement a method for decoding a point cloud as described in relation with FIG. 4 or 7-8.

In accordance with an example, the network is a broadcast network, adapted to broadcast still pictures or video pictures from a device A to decoding devices including the device B.

A signal, intended to be transmitted by the device A, carries the bitstream B. The bitstream B comprises an encoded first depth image and possibly at least a part of an encoded second depth image as explained in relation with FIG. 1. This signal further comprises an information data representing at least one depth coding mode $DCM_i$. Each depth coding mode indicates if the depth values of pixels in an image region i of the second depth image are encoded in the bitstream B ("explicit" mode) or not ("implicit" mode).

FIG. 11 shows an example of the syntax of such a signal when the data are transmitted over a packet-based transmission protocol. Each transmitted packet P comprises a header H and a payload PAYLOAD. A bit of the header H, for example, id dedicated to represent a depth coding mode $DCM_i$. Thus, at least one bit of the header H is dedicated to represent at least one depth coding mode $DCM_i$.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of reconstructing geometry of a point cloud, comprising:

decoding from a bitstream a first depth image of one or more depth images, the one or more depth images representing different depth values of orthogonally projected points of the point cloud onto a projection plane;

decoding, from a SPS message or a PPS message in the bitstream, a depth coding mode associated with a second depth image of the one or more depth images, the depth coding mode indicating whether the second depth image is encoded or not in the bitstream;

obtaining a first depth value for at least one first pixel of the first depth image; and responsive to the depth coding mode, determining a second depth value for at least one second pixel of the second depth image, the at least one second pixel being co-located to the at least one first pixel, the second depth value being determined from the first depth value of the at least one first pixel and a first depth value of at least one neighboring pixel of the at least one first pixel in the first depth image;

wherein the at least one neighboring pixel is obtained responsive to a determination that a spatial distance between the at least one first pixel in the first depth image and the at least one neighboring pixel is below a given threshold.

2. The method of claim 1, wherein the second depth value is determined as an average of the first depth value of the at least one neighboring pixel.

3. The method of claim 1, wherein the second depth value is determined as a maximum first depth value of the at least one neighboring pixel.

4. The method of claim 1, wherein the second depth value is determined as a minimum first depth value of the at least one neighboring pixel.

5. The method of claim 1, further comprising de-projecting the first depth image and the second depth image.

6. The method of claim 1, wherein the depth coding mode is encoded as a metadata associated with a reconstruction of the point cloud whose geometry is represented by the one or more depth images.

7. The method of claim 1, wherein if the depth coding mode indicates that the second depth image is encoded in the bitstream, the method further comprises decoding the second depth image from the bitstream.

8. A device for reconstructing geometry of a point cloud, comprising:

at least one processor configured to:

decode from a bitstream a first depth image of one or more depth images, the one or more depth images representing different depth values of orthogonally projected points of the point cloud onto a projection plane;

decode, from a SPS message or a PPS message in the bitstream, a depth coding mode associated with a second depth image of the one or more depth images, the depth coding mode indicating whether the second depth image is encoded or not in the bitstream;

obtain a first depth value for at least one first pixel of the first depth image; and responsive to the depth coding mode, determine a second depth value for at least one second pixel of the second depth image, the at least one second pixel being co-located to the at least one first pixel, the second depth value being determined from the first depth value of the at least one first pixel and a first depth value of at least one neighboring pixel of the at least one first pixel in the first depth image;

wherein the at least one neighboring pixel is obtained responsive to a determination that a spatial distance between the at least one first pixel in the first depth image and the at least one neighboring pixel is below a given threshold.

9. The device of claim 8, wherein the second depth value is determined as an average of the first depth value of the at least one neighboring pixel.

10. The device of claim 8, wherein the second depth value is determined as a maximum first depth value of the at least one neighboring pixel.

11. The device of claim 8, wherein the second depth value is determined as a minimum first depth value of the at least one neighboring pixel.

12. The device of claim 8, wherein the at least one processor is further configured to de-project the first depth image and the second depth image.

13. The device of claim 8, wherein the depth coding mode is encoded as a metadata associated with a reconstruction of the point cloud whose geometry is represented by the one or more depth images.

14. The device of claim 8, wherein the at least one processor is further configured to, if the depth coding mode indicates that the second depth image is encoded in the bitstream, decode the second depth image from the bitstream.

15. A non-transitory computer-readable medium including instructions for causing one or more processors to perform:

reconstructing geometry of a point cloud including:

decoding from a bitstream a first depth image of one or more depth images, the one or more depth images representing different depth values of orthogonally projected points of the point cloud onto a projection plane;

decoding, from a SPS message or a PPS message in the bitstream, a depth coding mode associated with a second depth image of the one or more depth images, the depth coding mode indicating whether the second depth image is encoded or not in the bitstream;

obtaining a first depth value for at least one first pixel of the first depth image; and responsive to the depth coding mode, determining a second depth value for at least one second pixel of the second depth image, the at least one second pixel being co-located to the at least one first pixel, the second depth value being determined from the first depth value of the at least one first pixel and a first depth value of at least one neighboring pixel of the at least one first pixel in the first depth image;

wherein the at least one neighboring pixel is obtained responsive to a determination that a spatial distance between the at least one first pixel in the first depth image and the at least one neighboring pixel is below a given threshold.

16. The non-transitory computer-readable medium of claim 15, wherein the second depth value is determined as an average of the first depth value of the at least one neighboring pixel.

17. The non-transitory computer-readable medium of claim 15, wherein the second depth value is determined as a maximum first depth value of the at least one neighboring pixel.

18. The non-transitory computer-readable medium of claim 15, wherein the second depth value is determined as a minimum first depth value of the at least one neighboring pixel.

19. The non-transitory computer-readable medium of claim 15, further comprising instructions for causing the one or more processors to de-project the first depth image and the second depth image.

20. The non-transitory computer-readable medium of claim 15, wherein the depth coding mode is encoded as a metadata associated with a reconstruction of the point cloud whose geometry is represented by the one or more depth images.

* * * * *